Oct. 27 3,537,009

FREQUENCY COMPARATOR

Filed Feb. 21, 1968

INVENTORS
CHARLES S. BROOKS, JR.
RICHARD H. DEVLIN

BY Charles B Curry
ATTORNEY

INVENTORS
CHARLES S. BROOKS, JR.
RICHARD H. DEVLIN

BY Charles S Curry
ATTORNEY

Oct. 27, 1970     C. S. BROOKS, JR., ET AL     3,537,009
FREQUENCY COMPARATOR
Filed Feb. 21, 1968     3 Sheets-Sheet 3
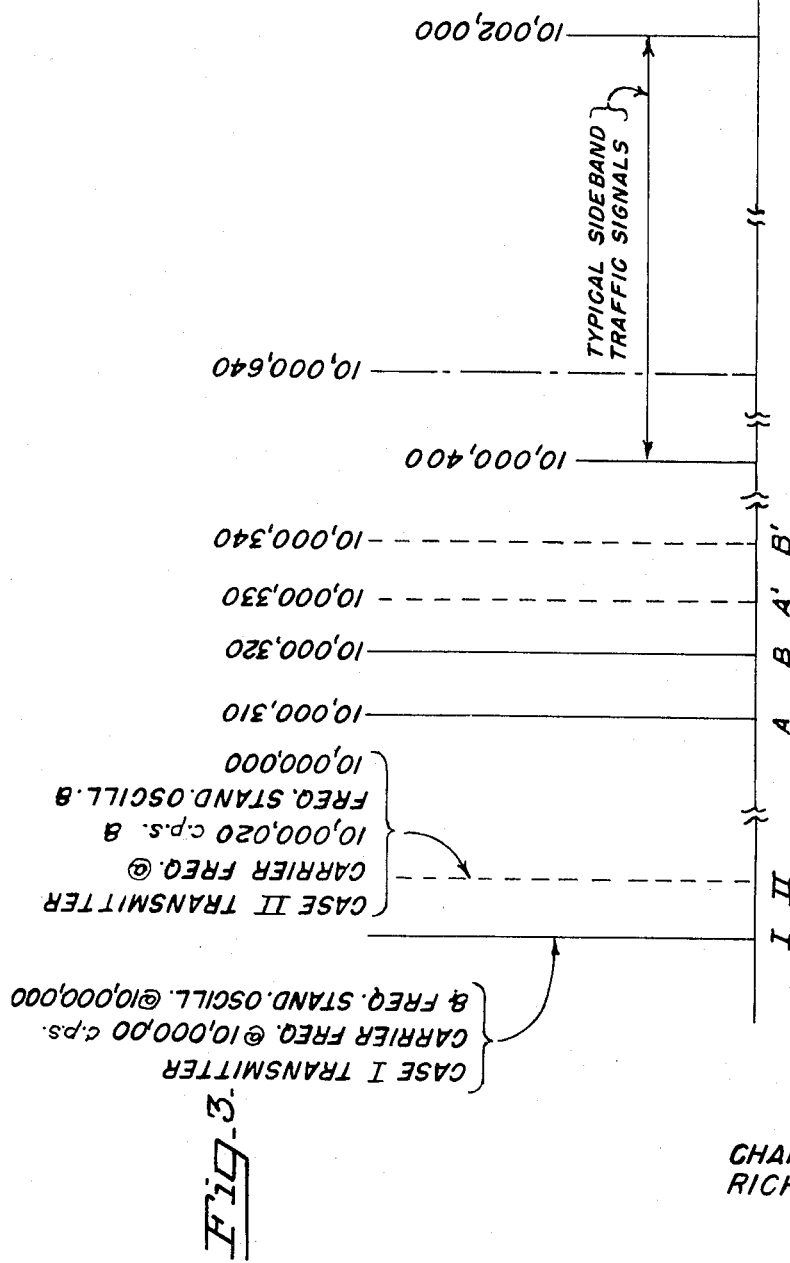
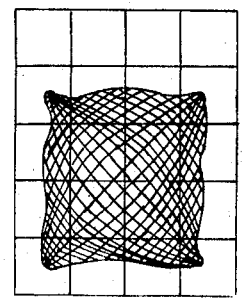
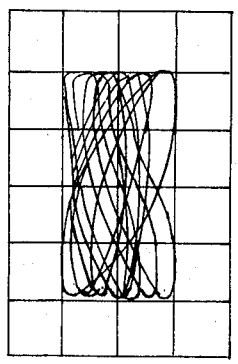
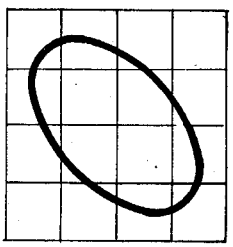
INVENTORS
CHARLES S. BROOKS, JR.
RICHARD H. DEVLIN
BY Charles S. Curry
ATTORNEY

# United States Patent Office 3,537,009
Patented Oct. 27, 1970

3,537,009
FREQUENCY COMPARATOR
Charles S. Brooks, Jr., Napa, Calif., and Richard H. Devlin, Milwaukie, Oreg., assignors to the United States of America as represented by the Secretary of the Navy
Filed Feb. 21, 1968, Ser. No. 708,477
Int. Cl. H04b 1/04
U.S. Cl. 325—133                                      7 Claims

ABSTRACT OF THE DISCLOSURE

A frequency comparison device that measures the carrier frequency of suppressed and non-suppressed carrier transmitters. A tone generator is provided for generating a low frequency tone signal that is frequency shifted at a slow rate. The tone signal is combined with the transmitter signal and with a standard signal from an oscillator providing a known or standard frequency. This combined signal is applied to the vertical deflection plates of an oscilloscope and the tone signal is applied to the horizontal deflection plates of the oscilloscope. When the screen of the oscilloscope shows a continuous Lissajous ellipse it is then known that the standard signal from the oscillator has the same frequency as the transmitter carrier signal.

The invention described herein may be manufactured and used by or for the Government of the United States of America for governmental purposes without the payment of any royalties thereon or therefor.

The present invention relates to a frequency comparator device which is an instrument frequently used at radio transmitting stations to facilitate the accurate measurement of transmitter carried frequencies. One of the difficulties with previous frequency comparators was the necessity of having to frequently shut down normal voices of other intelligence information and operate the transmitter at only the carrier frequency. In addition, prior devices have not been as accurate as often required and have had the further disadvantage of requiring the considerable expenditure of time for determining the station transmitter frequency. The time required was often several minutes which is a relatively long disruption from normal operations.

One of the objects of the present invention is to overcome these difficulties. In accordance with the present invention determination of the transmitter frequency may be made for all modes of fully suppressed single sideband (SSB) and non-suppressed (AM) carrier operation, without disruption to, or significant alteration of the intelligence being transmitted. The instrument is capable of operating over the frequency range of from about 2 to 32 megacycles and results in a significant reduction of the transmitter-frequency setup and monitoring time. In addition, operation measurement errors are virtually eliminated by a unique oscilloscope monitoring system. With this system, troublesome frequency computations and measurement ambiguities and uncertainties no longer present problems for operating personnel.

The frequency comparator operates with any R-F frequency standard of known frequency, accuracy, and stability. Because of the measurement technique employed, measurement accuracy is determined solely by the characteristics of the R-F frequency standard. An optional digital frequency counter can be connected to the R-F frequency standard output to provide a visual indication of the frequencies being measured. Therefore, the present invention provides a frequency comparator that has extremely high degree of accuracy, broad operating range, eliminates computation and operational errors, and provides a solution to many long standing problems in the communications field.

Briefly, the present invention relates to a frequency comparator device for measuring the carrier frequency of suppressed and non-suppressed carrier transmitters. This is achieved by generating a low frequency tone signal that is frequency shifted at a slow rate. For example, this tone signal may be $315 \pm 5$ cycles per second where it will be 310 cycles per second for about one second and at 320 cycles per second for about one second and then repeat.

For suppressed carrier transmitter frequency measurement, this tone signal is applied both to the audio upper or lower sideband channel of the transmitter and to the horizontal deflection plates of an oscilloscope. The R-F sideband output of the transmitter is mixed or combined with the output of a frequency standard oscillator and all frequencies of this combined signal, except the low frequency tone signal, are rejected or filtered out. The filtered tone signal is applied to the vertical deflection plates of the oscilloscope. If the frequencies of the signals applied to the vertical and horizontal deflection plate signals are identical, as will be indicated by a Lissajous ellipse on the screen of the oscilloscope, then it is known that the frequency standard oscillator signal has the same frequency as the suppressed carrier signal of the transmitter. If the screen of the oscilloscope does not show a Lissajous ellipse, then it is known that the frequency standard oscillator is not at the same frequency as the suppressed carrier of the transmitter.

In the embodiment of the present invention used for measuring the frequency of a non-suppressed carrier transmitter signal, the tone signal is mixed in a balanced modulator with the output signal of a frequency standard oscillator which provides a suppressed carrier upper and lower sideband output. This output is mixed or combined with the non-suppressed transmitter signal in a balanced detector. All of the frequencies, except the low frequency tone signal, from the balanced detector are rejected or filtered out. The isolated or filtered tone signal is applied to the vertical deflection plate of the oscilloscope and the tone signal, directly from the tone generator, is applied to the horizontal deflection plates. The analysis of the patterns on the oscilloscope screen are the same as with the suppressed carrier embodiment.

Frequency shifting of the tone signals eliminates ambiguity of measurements on the oscilloscope as would otherwise occur when the difference between the frequency of the standard oscillator and the transmitter carrier frequency is some integer multiple of the tone signal.

Other objects, advantages and novel features of the invention will become apparent from the following detailed description of the invention when considered in conjunction with the accompanying drawings wherein:

FIG. 3 is a diagram illustrating the operating characterisitcs of the present invention; and FIGS. 4A through 4C are diagrams illustrating the type of oscilloscope curves obtained by use of the present invention.

Figure 1:
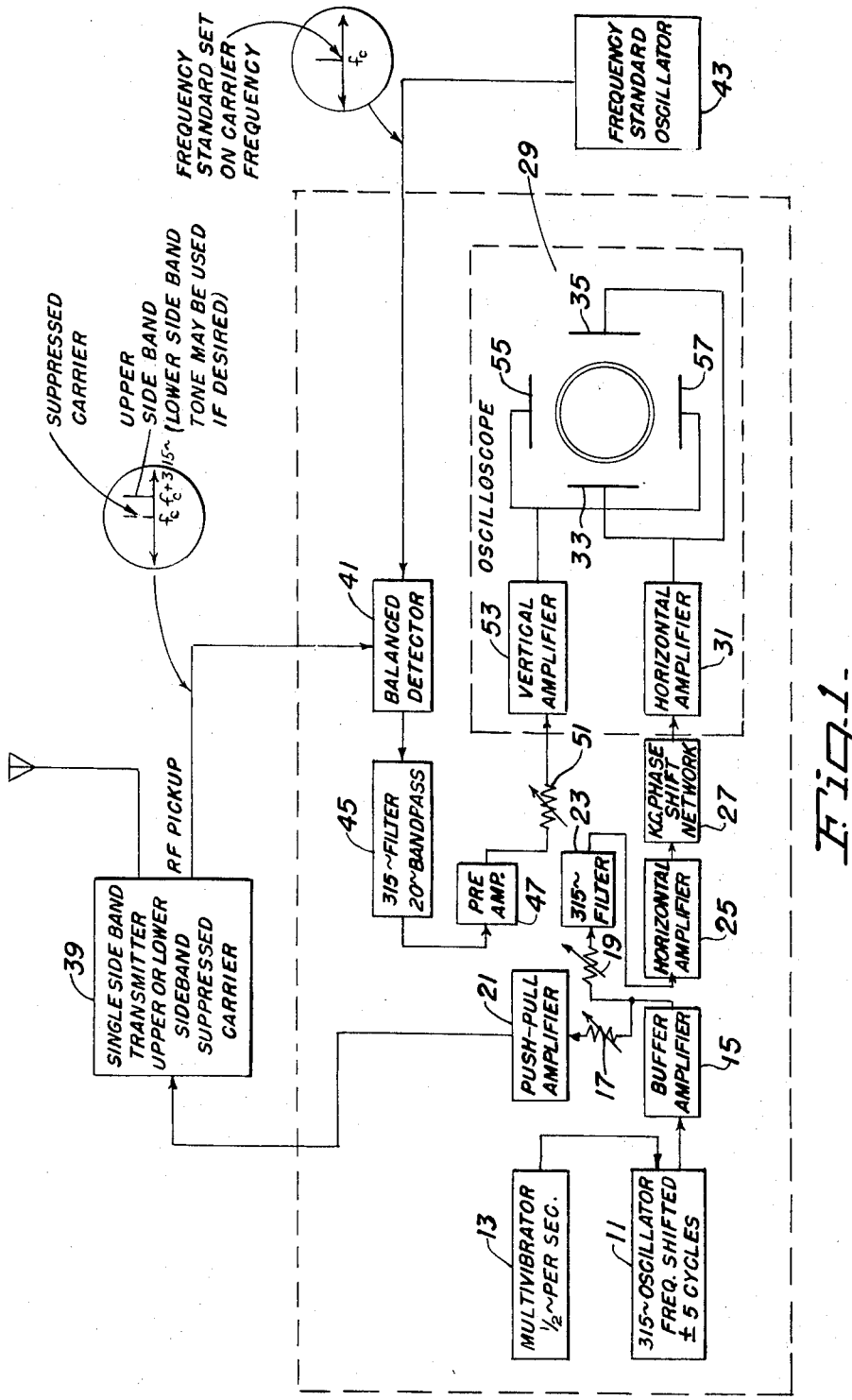
FIG. 1 is a block diagram of the frequency comparator of the present invention when used for SSB frequency comparison.

In FIG. 1 is illustrated the frequency comparator of the present invention when used to measure the frequency of SSB signals. Frequency shift oscillator 11 provides an output signal of 315 cycles per second which is shifted $\pm 5$ cycles per second at a ½ cycle per second rate. The ½ cycle per second oscillation rate is achieved by the use of multi-vibrator 13 the output signal of which is applied to the input of oscillator 11 to provide the required signal change for shifting the output signal of oscillator 11.

It is to be understood that the center frequency of oscillator 11 may be greater or lesser than 315 cycles per second. The particular frequency selected will depend primarily upon the audio frequency pass band of the transmitter being monitored and the adjacent traffic channel being used. In addition, the frequency shift of oscillator 11 may be greater or lesser than ±5 cycles per second. However, ±5 cycles per second was selected because it provided a good image on the screen of the oscilloscope. Furthermore, the time period for making the complete frequency change from 310 to 320 cycles per second, as determined by the signal from multivibrator 13 may be greater or lesser than ½ cycle per second. However, this time period has been found quite satisfactory because it gives adequate time to view the effect of the frequency variation on the screen of the oscilloscope. During operation oscillator 11 will preferably operate at 310 cycles per second for about one second and at 320 cycles per second for about one second and then repeat.

The output of oscillator 11 is applied to the input of buffer amplifier 15, the output of which is applied through variable resistors 17 and 19 respectively to the inputs of push-pull amplifier 21 and filter 23. Filter 23 is a bandpass filter, having the center frequency at 315 cycles per second and an about 20 cycles per second bandpass, the output of which is applied to horizontal amplifier 25. The output of horizontal amplifier 25 is applied to the input of RC phase shift network 27, the output of which is applied to oscilloscope 29. Phase shift network 27 functions to shift the signal from oscillator 11 about 45 degrees with respect to the signal received from balanced detector 41 to obtain a Lissajous ellipse on the screen of oscilloscope 29. In oscilloscope 29 the output of network 27 is applied to horizontal amplifier 31 the output of which is applied to horizontal deflection plates 33 and 35 of the oscilloscope.

The output of push-pull emplifier 21 is applied to the audio input of transmitter 39 which is under frequency test. Transmitter 39 is an upper or lower single sideband transmitter having a suppressed carrier. The R-F signal output of the transmitter 39, which has a signal output as illustrated in the associated diagram, is applied to one of the inputs of balanced detector 41.

The known frequency standard used for determining the operating frequency of transmitter 39 is provided by frequency standard oscillator 43. The output signal of oscillator 43 is applied to the other input of balanced detector 41. The output of oscillator 43 is illustrated in FIG. 1 and preferably provides a signal output that may be varied from at least 2 to 32 megacycles. However, the invention is not limited to this frequency range because it may be desirable to employ different frequencies to correspond with the carrier frequency of the transmitter being tested. During testing the frequency of oscillator 43 is initially selected to correspond as nearly as possible to the anticipated frequency of transmitter 39 and then the exact correspondence of frequencies is achieved in a manner as hereinafter described.

Balanced detector 41 is tuned to the frequency of the suppressed carrier and the original transmitter modulation is recovered by combining the sideband signal from transmitter 39 with the standard frequency of oscillator 43. The output of balanced detector 41 is applied to the input of filter 45 which is a bandpass filter the only passes frequencies in the range of about 315 cycles per second ±20 cycles per second. The output of filter 45 is applied to the input of preamplifier 47 the output of which is applied through variable resistor 51 to oscilloscope 29. In oscilloscope 29 the signal from variable resistor 51 is applied to the input of vertical amplifier 53 the output of which is applied to vertical deflection plates 55 and 57.

Filter 45 is employed to remove the high frequency signal from the output of balanced detector 41 and leave only the 315±5 cycles per second signal. Filter 23 is matched to filter 45. Filter 23 primarily functions to phase shift its 315±5 cycles per second input signal from oscillator 11 the same amount as filter 45 phase shifts its input signal from balanced detector 41. This eliminates Lissajous jitter on the screen of the oscilloscope which would occur if filter 23 were deleted.

It has been found that filters 23 and 45 may be deleted provided preamplifier 47 is a highly frequency selective amplifier which is centered at approximately 315 cycles per second and which introduces very small phase shift. This frequency selective amplifier is preferably an RC negative feedback type which introduces very small phase shift at this bandwidth.

In general, if the R-F frequency standard signal from oscillator 43 exactly coincides with the suppressed carrier frequency of transmitter 39 then a Lissajous ellipse will be obtained on the screen of oscilloscope 29 while the modulation of oscillator 11 is shifted ±5 cycles per second. This condition is illustrated in FIG. 4A. If the frequency of oscillator 43 does not coincide with the suppressed carrier frequency of transmitter 39 then none of these conditions will be attained and the image on the screen of the oscilloscope will be similar to those illustrated in FIG. 4B or 4C. However, if the difference between the frequency of oscillator 43 and the suppressed carrier frequency is some multiple of the frequency of oscillator 11, then, when oscillator 11 is at one extreme (for example, 310 cycles per second) the image on the screen of oscilloscope 29 would be a Lissajous ellipse as in FIG. 4A. However, at the other extreme (for example, 320 cycles per second) the image on the screen would be distorted as in FIG. 4B. Modulation of oscillator 11 is therefore very important because, if not modulated, then these multiple frequency differences would not be apparent because the oscilloscope screen would show a continuous Lissajous ellipse.

The following is a more detailed description of operation of the transmitter frequency comparator circuit of FIG. 1 in conjunction with the diagrams of FIGS. 3 and 4. The FIG. 3 diagram illustrates typical frequencies of operation of the transmitter 39, frequency standard oscillator 43, and oscillator 11 as it is frequency shifted ±5 cycles per second. In FIG. 3 is also illustrated the range of typical sideband traffic signals which are on the output of the transmitter when operating at a carrier frequency of 10,000,000 cycles per second.

Assume that transmitter 39 is operating at 10 megacycles or 10,000,000 cycles per second as indicated by reference numeral I of FIG. 3 and that standard oscillator 43 is also operating at exactly 10 megacycles or 10,000,000 cycles per second. When this set of conditions exists then at a certain time, for example time A of FIG. 3, the horizontal deflection plates 33 and 35 receive a signal from oscillator 11 having a frequency of 310 cycles per second (315−5=310) and the vertical deflection plates 55 and 57 also receive a signal having a frequency of 310 cycles per second. Since the output from oscillator 11 is at 310 cycles per second at time A and the carrier frequency of transmitter 39 is at 10,000,000 cycles per second, it therefore necessarily follows that the upper sideband frequency from transmitter 39, having a suppressed carrier, is at 10,000,310 cycles per second. Since this sideband frequency of 10,000,310 is beat against the 10,000,000 cycles per second signal from oscillator 43 in balanced detector 41, there is a resultant signal output from balanced detector 41 of 310 cycles per second which is applied through filter 45 to the vertical deflection plates at time A. Since both the horizontal and vertical deflection plates of oscilloscope respectively receive signals of the same frequency there will be a Lissajous ellipse displayed on the screen of oscilloscope 29.

At another time, for example time B of FIG. 3, where the signal frequency of oscillator 11 is at the maximum frequency of 315±5=320 cycles per second, then horizontal deflection plates 33 and 35 of oscillator 29 will be at 320 cycles per second (the output of oscillator 11) and the vertical deflection plates 55 and 57 of the oscilloscope will also be at 320 cycles per second (the beat frequency output of balanced detector 41). In this time B situation there is also a Lissajous ellipse displayed on the screen of oscilloscope 29 since the horizontal and vertical plates are at the same frequency. Since a Lissajous ellipse is displayed during times A and B (the full cycle), a Lissajous ellipse is continuously displayed on the screen of oscilloscope 29. Since it is known that the output of oscillator is at 10,000,000 cycles per second, it is therefore determined that the output of transmitter 39 is also at 10,000,000 cycles per second. This situation is shown in FIG. 4A.

Assume now that the carrier frequency of transmitter 39 is at 10,000,020 cycles per second and that oscillator 43 is at 10,000,000 cycles per second as indicated by reference numeral II of FIG. 3. In this situation, at time A' the horizontal plates 33 and 35 of oscilloscope 29 will be at 310 cycles per second (frequency of oscillator 11 at time A') and vertical plates 55 and 57 will be at 330 cycles per second. This latter condition exists because the sideband frequency from transmitter 39 is at 330 cycles per second (310+20=330). At time B' the horizontal plates are at 320 cycles per second and the vertical plates are at 340 cycles per second (320+20=340). Therefore there would not be a Lissajous ellipse at either of times A' or B' and it would be known that transmitter 39 is not operating at the standard oscillator output of 10,000,000 cycles per second. This condition is illustrated in FIG. 4B.

If oscillator 11 were not modulated, undesirable information would be indicated on the screen of the oscilloscope in those situations where the beat frequency output of balanced detector 41 is an integer multiple of the frequency of oscillator 11 when compared to the carrier frequency of the transmitter. For example, this would occur when transmitter 39 was operating at 10,000,000 cycles per second and oscillator 43 was operating at 10,000,630 cycles per second. If oscillator 11 were operated only at 315 cycles per second then the output of balanced detector 41 would be 315 cycles per second (10,000,630−10,000,315=315). Therefore, a continuous Lissajous ellipse would appear on the screen of the oscilloscope even though the transmitter was operating at 10,000,000 cycles per second and standard oscillator was operating at 10,000630 cycles per second.

It has been found that this erroneous indication is eliminated by modulating oscillator 11 ±5 cycles per second over a ½ cycle per second interval. The time selection of ½ cycle per second is sufficient for observing changes of the image on the screen of the oscilloscope. It will be apparent that other times could be employed such as ¼ of a second or two seconds or more.

To illustrate the function of frequency shifting oscillator 11 by ±5 cycles per second, assume that the transmitter is operating at 10,000,000 cycles per second and oscillator 43 is operating at 10,000,640 cycles per second. When this condition exists then at time A the horizontal plates are at 330 cycles per second (10,000,640−10,000,310) and the vertical plates are at 310 cycles per second (the output of oscillator 11). In this situation there would not be a Lissajous ellipse because 330 is not equal to 310 cycles per second. However, it should be noted that at time B the horizontal plates are 320 cycles per second (10,000,640−10,000,320) and the vertical plates are at 320 cycles per second (the output of oscillator 11). Therefore, a Lissajous ellipse is present because the horizontal and vertical plates are at the same frequency. It can be therefore seen that even though a Lissajous ellipse is present (time B) it is superposed only one-half of the time (time B) on the sceen of the oscilloscope and during other one-half of the time (time A) there will be no Lissajous ellipse. Therefore, it is known that the frequency of oscillator 43 is not the same as the carrier frequency of transmitter 39. In FIGS. 4A and 4C are illustrated the oscilloscope pattern when operating respectively at times B and A. A similar analysis is applicable when the frequency of oscillator 43 is at 10,000,620 cycles per second.

Figure 2:
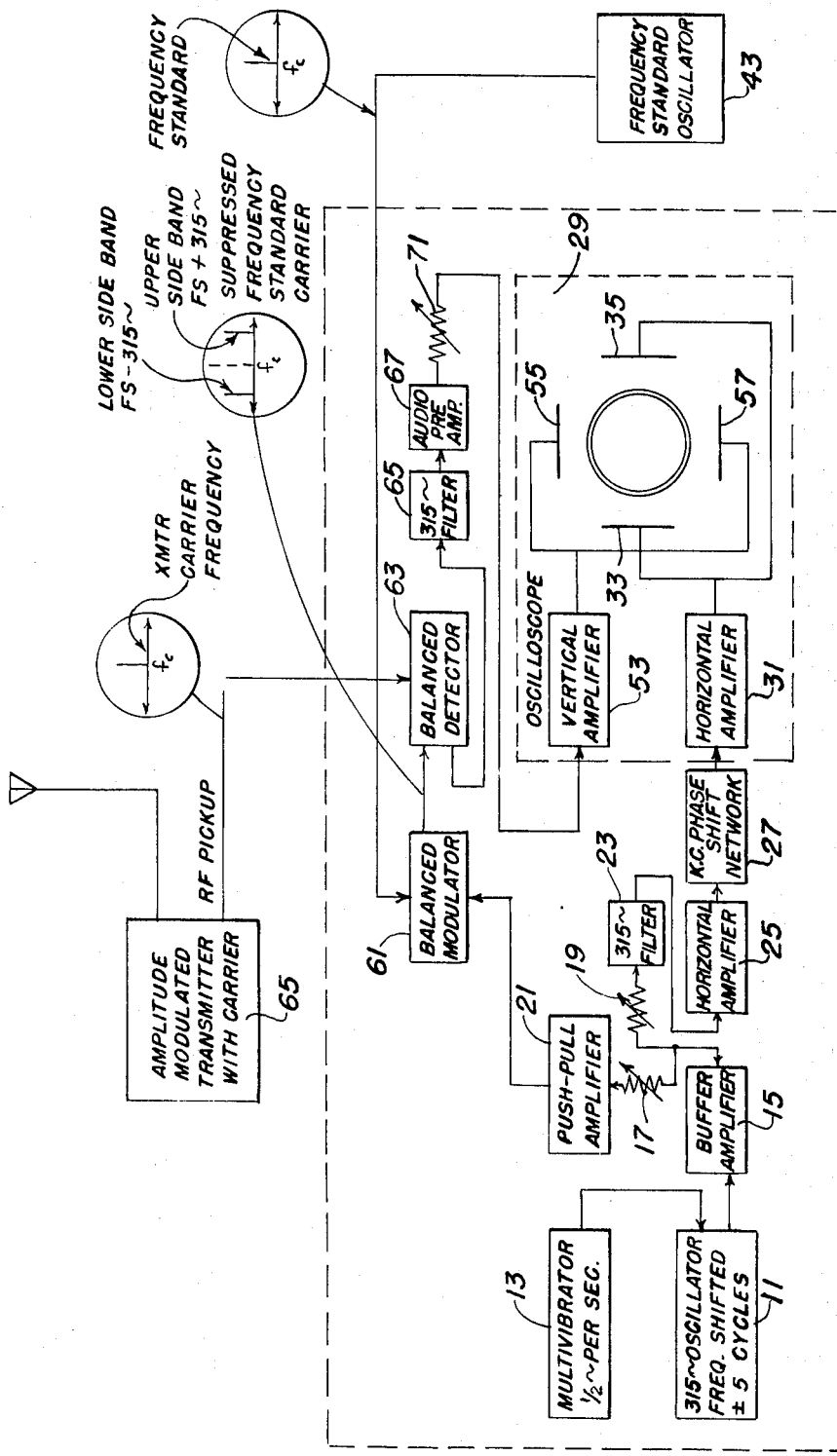
FIG. 2 is a block diagram of the frequency comparator of the present invention when used for AM frequency comparison.

In FIG. 2 it is illustrated the frequency comparator of the present invention when used for non-suppressed carrier or AM frequency comparison. Applied to the input of oscillator 11 is the output of multi-vibrator 13 which has a frequency of about ½ cycles per second. Oscillator 11 operates at 315±5 cycles per second. The output of oscillator 11 is applied to the input of buffer amplifier 15 the output of which is applied through variable resistor 17 to the input of amplifier 21 and through variable resistor 19 to the input of filter 23. The output of filter 23 is applied to the input of horizontal amplifier 25 the output of which is connected to the input of RC phase shift network 27. RC phase shift network 27 functions to shift the signal from oscillator 11 to about 45 degrees with respect to the signal received from balanced detector 63 to obtain a Lissajous ellipse on the screen of oscilloscope 29. The output of network 27 is connected to the input of horizontal amplifier 31 of oscilloscope 29. The output of horizontal amplifier 31 is then applied to horizontal deflection plates 33 and 35 of the oscilloscope.

The output of amplifier 21 is applied to one input of balanced modulator 61. The output of standard oscillator 43 is applied to the other input of balanced modulator 61 where the input signals are mixed as indicated by the associated digram of FIG. 2. The output of balanced modulator 61 is applied to one input of balanced detector 63. Applied to the other input of balance detector 63 is the output of amplitude modulated transmitter 65 which signal is indicated by the associated diagram. The output of detector 63 is then applied to bandpass filter 65 having a center frequency of 315 cycles per second. The output of filter 65 is applied to audio preamplifier 67 the output of which is applied through variable resistor 71 to the input of vertical amplifier 53 of oscilloscope 29. The output of vertical amplifier 53 is then applied in parallel to horizontal deflection plates 55 and 57 of oscilloscope 29.

Theoutput of balanced modulator 61 includes upper and lower sidebands with the carrier suppressed. In balanced detector 63 the transmitter carrier mixes with the double sideband suppressed output from balanced modulator 61 producing a demodulated audio output which is passed through bandpass filter 65.

As in FIG. 1 embodiment if the transmitter is operated at 10,000,000 cycles per second a Lissajous ellipse will be on the screen of oscilloscope 29 when oscillator 43 is also at 10,000,000 cycles per second. However, if the transmitter output is not at 10,000,000 cycles per second, then the pattern on the screen of oscilloscope 29 will not be stable and a Lissajous pattern will not be displayed. Since the operation of this embodiment of the present invention is very similar to that of the embodiment illustrated in FIG. 1 a detailed analysis will not be presented.

With respect to operation of the embodiment of FIGS. 1 and 2 it should be noted that in situations where an extremely accurate, high cost standard oscillator is not available the practice of the present invention may be achieved by a conventional low cost oscillator and a counting circuit such as those having several decades of flip-flop circuits. As above described, even though the conventional oscillator has an operating frequency that is several hundred cycles per second different from the transmitter carrier frequency and is at some multiple of the frequency of oscillator 11, the system will detect this difference and the standard oscillator can be adjusted upwards or downwards to achieve a Lissajous ellipse on the oscilloscope. The exact frequency of the transmitter and standard oscillator can then be determined by measuring the frequency of the standard oscillator with a counting circuit.

What is claimed is:
1. A frequency comparator for comparing the transmission signal of a transmitter with the standard signal of a frequency standard generator comprising:
 (a) a tone generator for generating a tone signal having a varying frequency;
 (b) combining means for combining said tone signal, said transmission signal and said standard signal to form a combined signal;
 (c) means for isolating said tone signal from said combined signal to form an isolated tone signal;
 (d) means for applying said isolated tone signal to one set of deflector plates of an oscilloscope;
 (e) means for applying said tone signal to the other set of deflector plates of an oscilloscope; and
 (f) said tone generator is a low frequency oscillator continuously generating a tone signal having at least two frequencies which are periodically shifted.

2. The frequency comparator of claim 1 wherein:
 (a) said tone generator is a low frequency oscillator continuously generating a tone signal having a first frequency of about 310 cycles per second and a second frequency of about 320 cycles per second where said time duration of said first frequency is about one second and the time duration of said second frequency is about one second.

3. The frequency comparator of claim 1 wherein:
 (a) said combining means includes a detector having one input for receiving the transmission signal from said transmitter and another input for receiving the standard signal from said frequency standard generator.

4. The frequency comparator of claim 1 wherein:
 (a) said combining means includes means for combining said tone signal with the carrier signal of said transmitter and a detector having a first input for receiving said standard signal and a second input for receiving the output of said transmitter.

5. The frequency comparator of claim 1 wherein:
 (a) said combining means including a modulator having a first input for receiving said tone signal, a second input for receiving said standard signal, and a detector having a first input for receiving said transmission signal and a second input for receiving the output signal from said modulator.

6. The frequency comparator of claim 4 wherein:
 (a) the combined signal output of said detector is applied to said means for isolating wherein said means for isolating comprises a bandpass fiilter that passes only the tone signal frequencies.

7. The frequency comparator of claim 5 wherein:
 (a) the combined signal output of said detector is applied to said means for isolating wherein said means for isolating comprises a bandpass filter that passes only the tone signal frequencies.

References Cited

UNITED STATES PATENTS

| | | | |
|---|---|---|---|
| 2,324,915 | 7/1943 | Dow | 250—17 |
| 3,167,712 | 1/1965 | Young et al. | 325—163 |
| 3,245,005 | 4/1966 | Garfield | 332—20 |

RICHARD MURRAY, Primary Examiner

K. W. WEINSTEIN, Assistant Examiner

U.S. Cl. X.R.

325—134